United States Patent
Bengtsson et al.

(10) Patent No.: US 8,774,068 B2
(45) Date of Patent: Jul. 8, 2014

(54) DUAL SWAPPING SWITCHES TO MEET LINEARITY DEMANDS OF CARRIER AGGREGATION

(71) Applicant: Sony Mobile Communications AB, Lund (SE)

(72) Inventors: Erik Bengtsson, Lund (SE); Olof Zander, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 35 days.

(21) Appl. No.: 13/649,594

(22) Filed: Oct. 11, 2012

(65) Prior Publication Data
US 2014/0105079 A1 Apr. 17, 2014

(51) Int. Cl.
*H04L 5/00* (2006.01)
(52) U.S. Cl.
USPC .......................................................... 370/297
(58) Field of Classification Search
USPC ......... 370/297, 229, 230, 252, 329, 310, 235;
343/893, 853, 837, 795, 876, 702, 834,
343/895, 746, 850, 718; 333/126, 132, 129,
333/101, 104, 252; 455/188.1, 272, 307,
455/552.1, 180.1, 550.1, 575.7, 456.6,
455/232.1, 230, 277.1
See application file for complete search history.

(56) References Cited

U.S. PATENT DOCUMENTS

| | | | |
|---|---|---|---|
| 2004/0092285 A1* | 5/2004 | Kodim ...................... | 455/552.1 |
| 2004/0266378 A1* | 12/2004 | Fukamachi et al. ....... | 455/188.1 |
| 2006/0025171 A1* | 2/2006 | Ly et al. .................... | 455/553.1 |
| 2009/0206948 A1* | 8/2009 | Kemmochi et al. ........... | 333/126 |
| 2010/0090777 A1 | 4/2010 | Song et al. | |
| 2010/0260082 A1 | 10/2010 | Lum et al. | |
| 2010/0277252 A1* | 11/2010 | Gorbachov ................... | 333/104 |
| 2010/0279709 A1 | 11/2010 | Shahidi et al. | |
| 2011/0175789 A1* | 7/2011 | Lee et al. ..................... | 343/853 |
| 2011/0228713 A1 | 9/2011 | Alexopoulos et al. | |
| 2012/0112970 A1 | 5/2012 | Caballero et al. | |

FOREIGN PATENT DOCUMENTS

| | | |
|---|---|---|
| EP | 1 947 774 A1 | 7/2008 |
| EP | 2 254 252 A2 | 11/2010 |
| WO | WO 2012/048741 A1 | 4/2012 |

OTHER PUBLICATIONS

Partial European Search Report, EP Application No. 13183833.6, Nov. 15, 2013.
Extended European Search Report, EP Application No. 13183833.6, Feb. 7, 2014, 13 pages.

* cited by examiner

*Primary Examiner* — Abdullah Riyami
(74) *Attorney, Agent, or Firm* — Myers Bigel Sibley & Sajovec, P.A.

(57) ABSTRACT

Antenna switch structures having dual switches for swapping high band main and diversity signals and low band main and diversity signals on multiple antennas, including dual-band antennas. Related systems and devices are also described.

20 Claims, 5 Drawing Sheets

DUAL SWAPPING SWITCHES TO MEET LINEARITY DEMANDS OF CARRIER AGGREGATION

FIELD

The present inventive concepts generally relate to the field of communications and, more particularly, to antennas and wireless electronic devices incorporating the same.

BACKGROUND

Mobile terminals for wireless communication are used in different communication standards such as global system for mobile communications (GSM), digital cellular system (DCS), and Universal Mobile Telecommunications System (UMTS). Each of these communication standards cover and use different frequency bands. For a mobile terminal to be used with different standards, it needs to be capable of transmitting, receiving and processing signals on different frequency bands. Radiated performance is also a critical parameter in mobile communication. Particularly with mobile phones, radiated performance is dependent on the use of the phone.

User effects, such as the way a user holds a mobile terminal relative to the positioning of the internal antenna elements may affect the over-the-air performance of the device. The near field of the antennas such as hands and head strongly influence the antennas. In modern mobile terminals, two or more antennas can be used for communication to the base station. Since a transmitter may use only one antenna, total radiated power (TRP) can be improved by using switched diversity, or simply "using the best antenna." For example, the best antenna for transmitting may be used by simply swapping the RF channels between the platform front-end-module (FEM) and the antenna. This technique is known as antenna swapping. A given wireless electronic device may swap from using one group of antennas with its transmission chains to using a different group of antennas.

Wireless communication devices, such as WIFI 802.11N and LTE compliant communication devices, are increasingly using Multiple Input-Multiple Output (MIMO) antenna technology to provide increased data communication rates with decreased error rates. A MIMO antenna includes at least two antenna elements.

MIMO technology may offer significant increases in data throughput and/or transmission range without the need for additional bandwidth or transmit power. It can achieve this due to the ability of MIMO to obtain higher spectral efficiency (more bits per second per hertz of bandwidth) and/or reduced fading.

MIMO based systems allow the use of a variety of coding techniques that take advantage of the presence of multiple transmit and receive antennas. For example, wireless communications performed over a MIMO channel can use beamforming, spatial multiplexing and/or diversity coding techniques.

One technique is called downlink carrier aggregation, or simply carrier aggregation (CA). CA is a technique where two or more frequency bands are used together in order to increase the total (aggregated) bandwidth. For downlink CA, four receivers, two at each frequency band (main+diversity) are working at the same time but with only one transmitter. In some cases where a harmonic of the transmitted signal falls directly in the receive band of the other carrier, there will be extremely high linearity requirements on the circuit path between the transmitter and the antenna. In particular, extreme linearity requirements will be put on the antenna swapping switch (DPDT) when the antenna swapping technique is combined with CA.

SUMMARY

According to embodiments, an antenna switch structure for use in a mobile communication terminal comprises a first transceiver comprising a low band main circuit path configured to process signals of a low main frequency band and second transceiver comprising a high band main circuit path configured to process signals of a high main frequency band. The antenna switch structure also comprises a first receiver comprising a low band diversity circuit path configured to process signals of a low diversity frequency band and a second receiver comprising a high band diversity circuit path configured to process signals of a high diversity frequency band. The structure also comprises first and second dual band antennas configured to transmit and receive wireless signals of two or more frequency bands. The structure may further comprise a first diplexer connected to the first dual band antenna and a second diplexer connected to the second dual band antenna.

The structure may also comprise a first switch and a second switch. The first switch is controlled to switch between a first mode that connects the first port of the of the first diplexer to the first transceiver and the first port of the second diplexer to the first receiver and a second mode that connects the first port of the first diplexer to the first receiver and the first port of the second diplexer to the first transceiver. The mode of the first switch is selected in response to signals received at the first switch. The second switch is controlled to switch between a first mode that connects the second port of the first diplexer to the second transceiver and the second port of the second diplexer to the second receiver and a second mode that connects the second port of the first diplexer to the second receiver and the second port of the second diplexer to the second transceiver. The mode of the second switch is selected in response to signals received at the second switch.

In further embodiments, the mode of the first switch is further selected in response to a frequency of a signal received at the second switch and the mode of the second switch is further selected in response to a frequency of a signal received at the first switch.

According to some embodiments, the first mode of the first switch transmits a low band main signal to the low band main circuit path of the first transceiver and the second mode of the first switch transmits a low band diversity signal to the low band diversity circuit path of the first receiver.

According to other embodiments, the first mode of the second switch transmits a high band main signal to the high band main circuit path of the second transceiver and the second mode of the second switch transmits a high band diversity signal to the high band diversity circuit path of the second receive.

In other embodiments, the first switch may be configured to select between transmitting a signal, such as a low band main signal, to the first diplexer and transmitting a signal to the second diplexer. The second switch may be configured to select between transmitting a signal, such as a high band main signal, to the first diplexer and transmitting a signal to the second diplexer.

According to various embodiments, the antenna switch structure may perform carrier aggregation and filter out a harmonic frequency of a traveling signal associated with a circuit path of the first or second transceiver before the traveling signal is transmitted by the first or second dual band antenna.

According to other embodiments, an antenna switch structure for use in a mobile communication terminal comprises a first transceiver comprising a low band main circuit path configured to process signals of a low main frequency band and second transceiver comprising a high band main circuit path configured to process signals of a high main frequency band. The antenna switch structure also comprises a first receiver comprising a low band diversity circuit path configured to process signals of a low diversity frequency band and a second receiver comprising a high band diversity circuit path configured to process signals of a high diversity frequency band. The structure also comprises first and second low band antennas configured to transmit and receive wireless signals of a low frequency band and first and second high band antennas configured to transmit and receive wireless signals of a high frequency band. The structure further comprises a first low pass filter connected to the first low band antenna and a second low pass filter connected to the second low band antenna.

The structure also comprises a first switch and a second switch. The first switch is controlled to switch between a first mode that connects the first low pass filter to the first transceiver and the second low pass filter to the first receiver and a second mode that connects the first low pass filter to the first receiver and the second low pass filter to the first transceiver. The mode of the first switch is selected in response to signals received at the first switch. The second switch is controlled to switch between a first mode that connects the first high band antenna to the second transceiver and the second high band antenna to the second receiver and a second mode that connects the first high band antenna to the second receiver and the second high band antenna to the second transceiver. The mode of the second switch is selected in response to signals received at the second switch.

In further embodiments, the mode of the first switch is further selected in response to a frequency of a signal received at the second switch and the mode of the second switch is further selected in response to a frequency of a signal received at the first switch.

In further embodiments, the mode of the first switch is further selected in response to a frequency of a signal received at the second switch and the mode of the second switch is further selected in response to a frequency of a signal received at the first switch.

According to some embodiments, the first mode of the first switch transmits a low band main signal to the low band main circuit path of the first transceiver and the second mode of the first switch transmits a low band diversity signal to the low band diversity circuit path of the first receiver.

In some embodiments, the first switch is configured to switch between transmitting a signal to the first low pass filter and transmitting a signal to the second low pass filter, and the second switch is configured to switch between transmitting a signal to the first high band antenna and transmitting a signal to the second high band antenna.

In various embodiments, a wireless electronic device comprises first and second dual band antennas and first and second diplexers connected to the dual band antennas. The device also comprises a radio configured for carrier aggregation and comprising first, second, third and fourth frequency circuit paths. The device further comprises a first switch and a second switch. The first switch is controlled to switch between a first mode that connects the first diplexer to the first frequency circuit path and the second diplexer to the second frequency circuit path and a second mode that connects the first diplexer to the second frequency circuit path and the second diplexer to the first frequency circuit path. The mode of the first switch is selected in response to signals received at the first switch. The second switch is controlled to switch between a first mode that connects the first diplexer to the third frequency circuit path and the second diplexer to the fourth frequency circuit path and a second mode that connects the first diplexer to the fourth frequency circuit path and the second diplexer to the third frequency circuit path. The mode of the second switch is selected in response to signals received at the second switch.

In various embodiments, a harmonic frequency of a traveling signal associated with a circuit path of the transceiver is filtered out before the traveling signal is transmitted by the first or second dual band antennas.

Other devices and/or operations according to embodiments of the inventive concepts will be or become apparent to one with skill in the art upon review of the following drawings and detailed description. It is intended that all such additional devices and/or operations be included within this description, be within the scope of the present inventive concepts, and be protected by the accompanying claims. Moreover, it is intended that all embodiments disclosed herein can be implemented separately or combined in any way and/or combination.

DETAILED DESCRIPTION OF EMBODIMENTS

Figure 1:
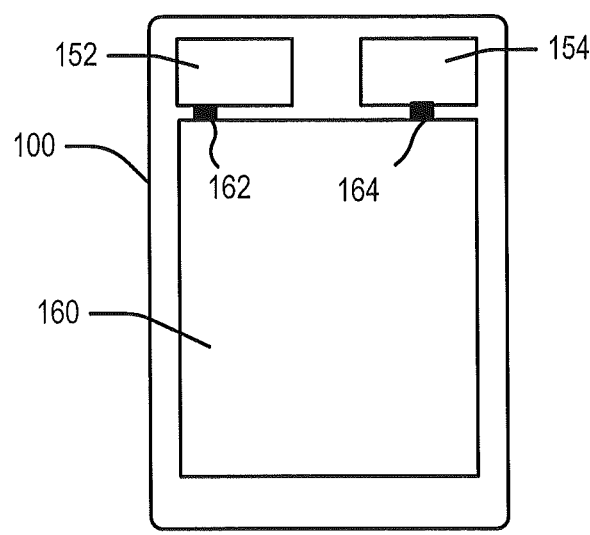
FIG. 1 is a diagram of a mobile terminal that includes a Multiple Input-Multiple Output (MIMO) antenna array in accordance with some embodiments of the present invention.

The present inventive concepts now will be described more fully with reference to the accompanying drawings, in which embodiments of the inventive concepts are shown. However, the present application should not be construed as limited to the embodiments set forth herein. Rather, these embodiments are provided so that this disclosure will be thorough and complete, and to fully convey the scope of the embodiments to those skilled in the art. Like reference numbers refer to like elements throughout.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein the term "and/or" includes any and all combinations of one or more of the associated listed items.

Spatially relative terms, such as "above", "below", "upper", "lower" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms first, second, etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which these embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is to be understood that the functions/acts indicated in the illustrated blocks may occur out of the order noted in the operational illustrations. For example, two blocks shown in succession may in fact be executed substantially concurrently or the blocks may sometimes be executed in the reverse order, depending upon the functionality/acts involved.

For purposes of illustration and explanation only, various embodiments of the present inventive concepts are described herein in the context of "wireless electronic devices." Among other devices/systems, wireless electronic devices may include multi-band wireless communication terminals (e.g., portable electronic devices/wireless terminals/mobile terminals/terminals) that are configured to carry out cellular communications (e.g., cellular voice and/or data communications) in more than one frequency band. It will be understood, however, that the present inventive concepts are not limited to such embodiments and may be embodied generally in any device and/or system that is configured to transmit and receive in two or more frequency bands.

As used herein, "mobile communication terminal" includes, but is not limited to, a terminal that is configured to receive and/or transmit communication signals via a wireless air interface with, for example, a cellular network, a wireless local area network (WLAN), and/or another communication terminal (e.g., via a Bluetooth interface). Examples of mobile communication terminals include, but are not limited to, cellular phones, satellite phones, headsets (e.g., Bluetooth headset), laptop and/or palmtop computers configured to receive and/or transmit wireless communication signals.

It will be understood that embodiments of the invention may be implemented in an electronic device, such as a mobile terminal, that includes a Multiple-Input Multiple-Output (MIMO) antenna that is configured to transmit and receive RF signals in two or more frequency bands. The MIMO antenna may be configured, for example, to transmit/receive RF communication signals in the frequency ranges used for cellular communications (e.g., cellular voice and/or data communications), WLAN communications, and/or TransferJet communications, etc. As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA or smart phone that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

It will be understood that mobile terminals according to various embodiments of the invention may operate in any type of wireless communications network. In some embodiments according to the invention, for example, the network may provide services broadly labeled as PCS (Personal Communications Services) including advanced digital cellular systems conforming to standards such as IS-136 and IS-95, lower-power systems such as DECT (Digital Enhanced Cordless Telephone), data communications services such as CDPD (Cellular Digital Packet Data), and other systems such as CDMA-2000, that are proposed using a format commonly referred to as Wideband Code Division Multiple Access (WCDMA).

Some embodiments of the present invention stem from a realization that Long Term Evolution (LTE) mobile devices may need antenna systems that cover twenty or more frequency bands, including, but not limited to, 704-746 MHz, 760-800 MHz, 824-894 MHz, 880-960 MHz, 1710-1850 MHz, 1820-1990 MHz, 1920-2170 MHz, and 2500-2700 MHz. The antenna systems used in LTE devices may also need to meet the requirements of Single In-Single Output (SISO) and Single In-Multiple Output (SIMO) applications for other 3GPP and 2G bands. The antenna systems may be required to meet Specific Absorption Rate (SAR) requirements and other industry standards. To enhance the performance of such a device, an intelligent control system, according to some embodiments of the present invention, may be used to select particular antenna(s) for transmitting and receiving wireless signals based on various performance factors and criteria. In some embodiments, the antenna selection may be based on various modes of operation of the device, such as particular ways a user holds the device during operation.

FIG. 1 illustrates a mobile terminal 100 including a MIMO antenna that includes at least two radiating elements or antennas 152, 154. The first and second radiating elements 152, 154 may be formed on a planar substrate, such as on a conventional printed circuit board, which includes a dielectric material, ceramic material, or insulation material. The first and second radiating elements 152, 154 are adjacent to grounding elements 160, which couple the first and second radiating elements 152, 154 to a ground plane on the printed circuit board. The first and second radiating elements 152, 154 may be formed by patterning a conductive (e.g., metallization) layer on a printed circuit board. The ground plane 160 may act as a counterpoise for each of the first and second radiating elements 152, 154.

RF signals are coupled to the first radiating element 152 through a first feed element or port 162, while RF signals are coupled to the second radiating element 154 through a second feed element or port 164. The first feed element 162 is coupled to the first radiating element 152 near an end of the first radiating element 152, so that the first radiating element 152 generally extends away from the first feed element 162 along an upper end of the mobile terminal 100.

Similarly, the second feed element 164 is coupled to the second radiating element 154 near an end of the second radiating element 154, so that the second radiating element 152 generally extends away from the second feed element 164 along the upper end of the mobile terminal 100. The two radiating elements 152 and 154 may be separated via an isolator element.

Although shown with both radiating elements or antennas 152, 154 at the same end of the mobile terminal 100, it will be understood that the radiating elements or antennas 152 and 154 may be disposed in a variety of positions in mobile terminal 100 in accordance with various embodiments of the present invention. Moreover, more than two antennas can be used in other embodiments of the present invention.

Figure 2:
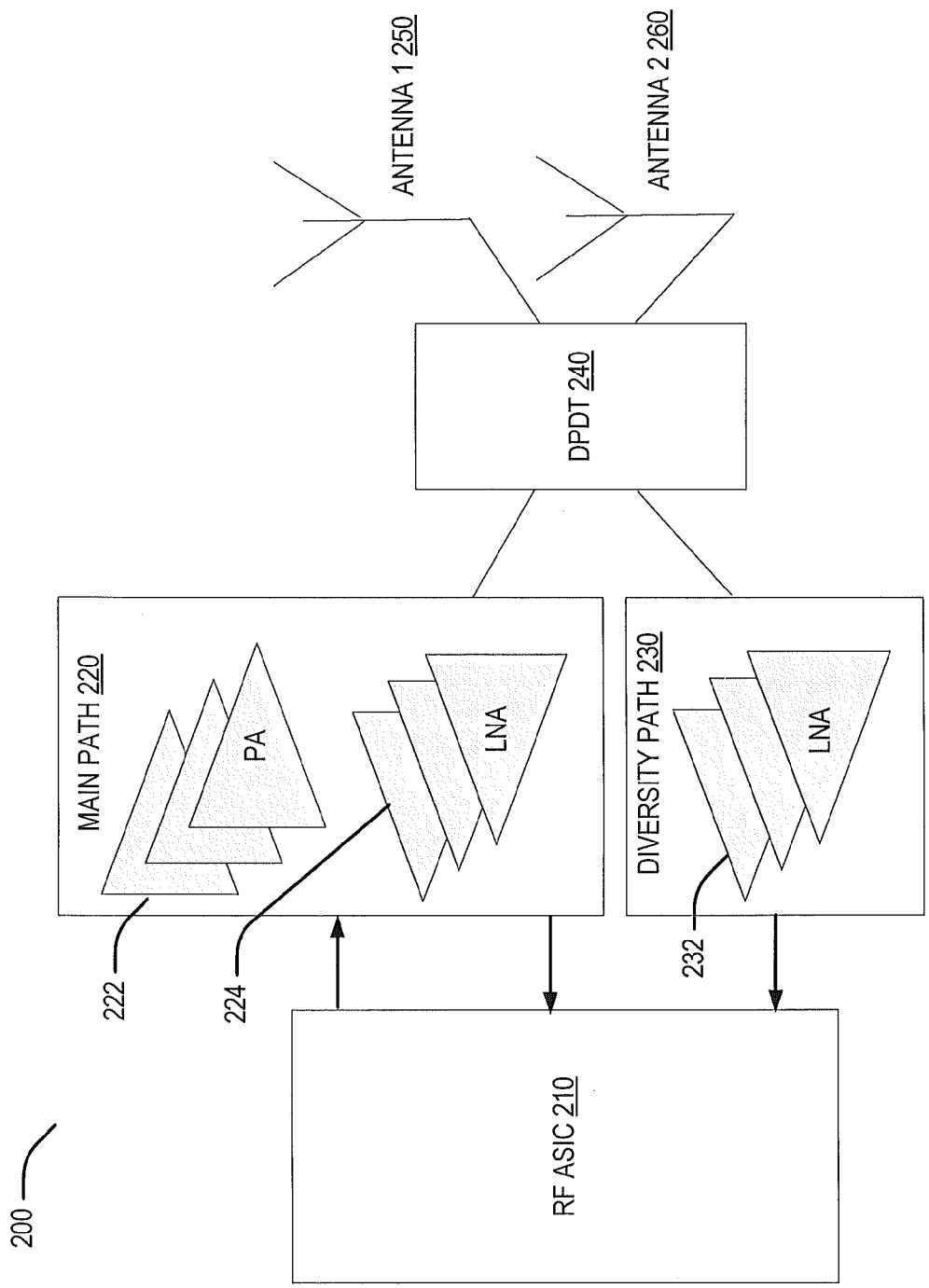
FIG. 2 is a block diagram illustrating an antenna swapping system for selecting an antenna in a mobile terminal that includes a MIMO antenna system.

FIG. 2 is a block diagram illustrating an example MIMO antenna system 200 for selecting an antenna in a mobile terminal, such as mobile terminal 100 of FIG. 1. The MIMO antenna system 200 comprises antennas 250 and 260, comparable to radiating elements 152 and 154 of FIG. 1, which are connected to downconvertor circuitry via a DPDT 240. The downconvertor circuitry comprises low noise amplifiers (LNAs) 224 and 232 in the main circuit path 220 and diversity circuit path 230, respectively, along with power amplifiers (PAs) 222 in the main circuit path.

A Radio Frequency (RF) Application Specific Integrated Circuit (ASIC) 210 is coupled to the amplifier circuits 222, 224 and 232 and may be configured to implement the mixer circuits, oscillators, and input/output filters to generate the complex baseband signal from a received RF signal via antennas 250 and 260 and to generate the RF signal for transmission on one of the antennas 250 and 260 from a complex baseband signal. To enhance the performance of a mobile terminal incorporating the MIMO antenna system 200, the DPDT 240 is operable in response to various control circuitry and signals to select one the antennas 250 and 260 for transmission and to select which of the antennas 250 and 260 is to be used for the main circuit path signal and which is to be used for the diversity circuit path signal when processing a received RF signal.

Carrier aggregation (CA) is a technique where two or more frequency bands are used together in order to increase the total (aggregated) bandwidth. In some cases where a harmonic of the transmitted signal falls directly in the receive band of the other carrier, there will be extremely high linearity requirements on the circuit path between the transmitter and the antenna. For example, the harmonic of a transmission frequency of 700 MHz may be three times as high, equivalent to the 2100 MHz receiving frequency. In particular, extreme linearity requirements will be put on the antenna swapping switch (DPDT) when the antenna swapping technique is combined with CA. Mobile terminals that use CA need to meet current and future linearity requirements.

Figure 3:
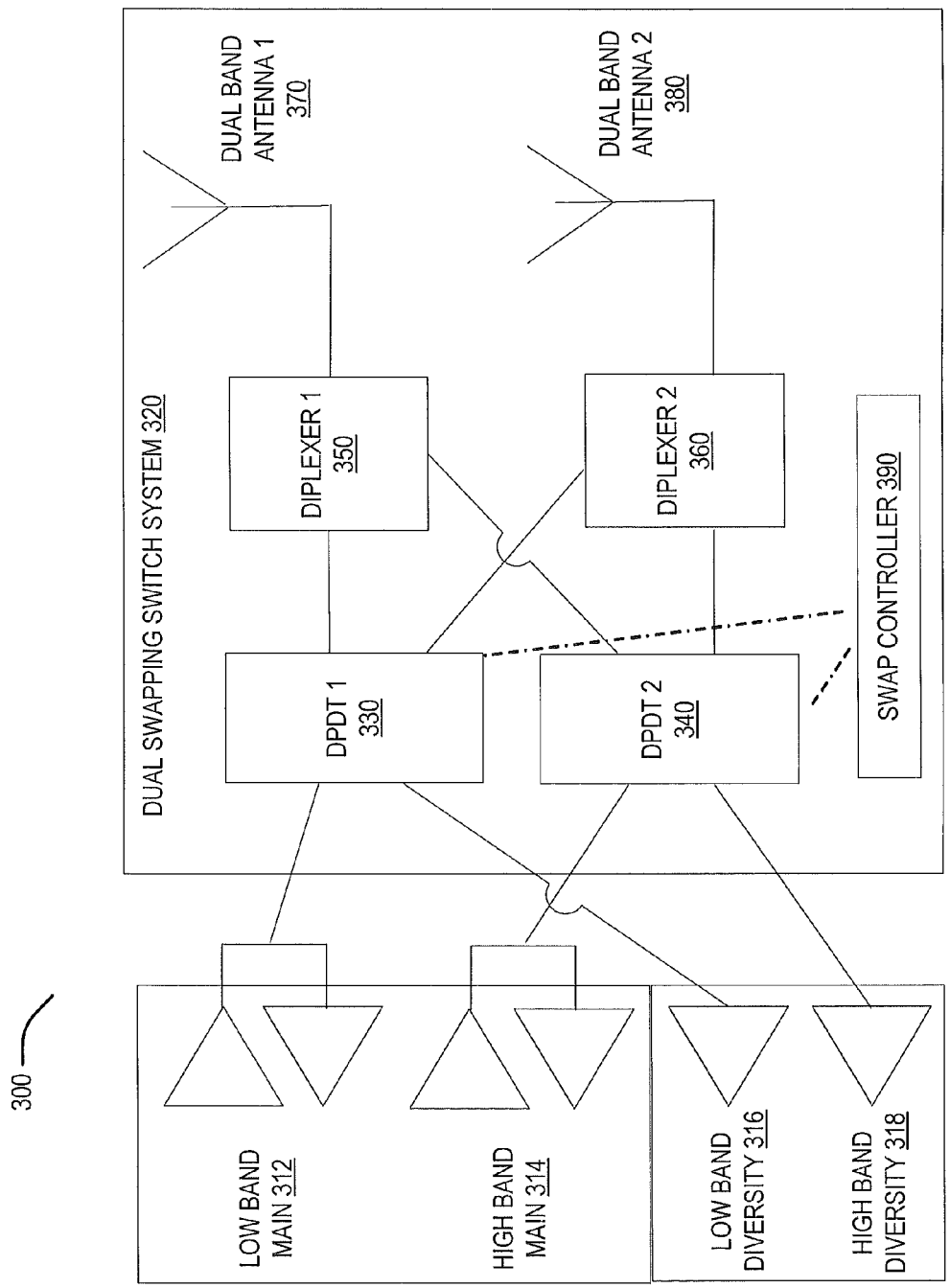
FIG. 3 is a block diagram illustrating a dual switch antenna swapping system in accordance with various embodiments of the present invention.

FIG. 3 is a block diagram illustrating MIMO antenna system 300 for selecting antennas in a mobile terminal according to some embodiments. The MIMO antenna system 300 is similar to that illustrated in FIG. 2, but includes dual swapping switch system 320.

Dual swapping switch system 320 includes two or more DPDT switches, such as DPDT 1 330 and DPDT 2 340. System 320 also includes diplexer 1 350 and diplexer 2 360. DPDT 1 330 is connected to diplexer 1 350 and/or diplexer 2 360. DPDT 2 340 is connected to diplexer 1 350 and/or diplexer 2 360. Diplexer 1 350 is electrically connected to dual band antenna 1 370. Diplexer 2 360 is electrically connected to dual band antenna 2 380. Each antenna may be internal to a mobile communication terminal, and which may be internal to the antenna switch structure, and are configured to transmit and receive wireless signals of different frequency bands. Diplexer 1 350 and diplexer 2 360 may each have two ports.

DPDT 1 330 is a DPDT switch controlled to switch between a first mode that connects the first port of diplexer 1 350 to the circuit path of low band main 312 and the first port of diplexer 2 360 to the circuit path of low band diversity 316 and a second mode that connects the first port of diplexer 1 350 to the circuit path of low band diversity 316 and the first port of diplexer 2 360 to the circuit path of low band main 312.

DPDT 2 340 is a DPDT switch configured to switch between a first mode that connects the second port of diplexer 1 350 to the circuit path of high band main 314 and the second port of diplexer 2 360 to the circuit path of high band diversity 318 and a second mode that connects the second port of diplexer 1 350 to the circuit path of high band diversity 318 and the second port of diplexer 2 360 to the circuit path of high band main 314.

The mode for DPDT 1 330 and the mode for DPDT 2 340 are selected based on the signal or signals that each switch respectively receives. For example, if DPDT 1 330 receives a low band main signal from diplexer 1 350 or diplexer 2 360, the first mode may be selected to transmit that signal to the circuit path of low band main 312. Otherwise, if a low band diversity signal is received by DPDT 1 330, DPDT 1 330 is switched to the second mode to transmit the low band diversity signal to the circuit path of low band diversity 316.

In some cases, if DPDT 1 330 is switched to transmit a low band main signal, DPDT 2 340 may be switched to transmit a high band main. In other cases, DPDT 1 330 and DPDT 2 340 may be controlled to coordinate modes based on the signal that one or both of them receive.

Modes and switching may be controlled by DPDT switches 330 and 340 or other components of dual swapping switch system 320. For example, swap controller 390 may be configured to receive frequency and switch state information from switches 330 and 340, diplexers 350 and 360, and/or other circuitry in dual swapping switch system 320. It may then use algorithms to determine which modes will be most efficient for each switch (or diplexer) and will coordinate switch modes to help control traffic flow in both directions and to reduce harmonics. Some algorithms will coordinate transmission of high and low main and diversity pairs, both in reception and in transmission or aggregation, so that associated signals are received or transmitted in a timely way.

In regard to receiving wireless signals from antennas 370 and 380, each of diplexer 1 350 and diplexer 2 360 may receive wireless signals from dual band antennas 370 or 380 and send the signals along an appropriate circuit path either to DPDT 1 330 and/or DPDT 2 340. In further implementations, a signal for high band main circuit path 314 may be aggregated with a signal for high band diversity circuit path 318 and a signal for low band main circuit path 312 may be aggregated with a signal from low band diversity circuit path 316. In some implementations, DPDT 1 330 may receive a low band main signal or a low band diversity and may switch accordingly between both low band signals. Meanwhile, DPDT 2 340 may receive a high band main signal or a high band diversity signal and may switch accordingly between both high band signals. With dual DPDT switches, system 320 may swap high band signals and low band signals separately. In some cases, only one switch may be operating while the other switch is inactive. This may be the case if there are four downlink signals but only one uplink signal. The high band switch may be active but the low band switch may be inactive or vice versa.

Further in regard to transmission of wireless signals using antennas 370 and 380, a signal from high band main circuit path 314 may be sent to DPDT 2 340 and a signal from low band main circuit path 312 may be sent to DPDT 1 330. In some implementations, DPDT 1 330 may receive a low band main signal or a low band diversity and may switch accordingly between both low band signals. Meanwhile, DPDT 2 340 may receive a high band main signal or a high band diversity signal and may switch accordingly between both high band signals. With dual DPDT switches, system 320 may swap high band signals and low band signals separately. Each of diplexer 1 350 and diplexer 2 360 may receive signals from DPDT 1 330 or DPDT 2 430, combine them if necessary and send the signals to respective dual band antennas 370 and 380.

The DPDT switches, placed before diplexers 350 and 360, are used to filter transmitter harmonics when antenna swapping is combined with carrier aggregation. By swapping high band and low band separately, it will be possible to relax the linearity specification of the swapping switch.

Harmonics need to be filtered and rejected before signals are combined. It may be too late otherwise. Therefore, all non-linear components need to be placed before the filtering devices or diplexers.

In further embodiments, DPDT 1 330 may be configured to transmit a low band main signal to the low band main circuit path 312 of a first transceiver or a low band diversity signal to the low band diversity circuit path 316 of a first receiver. DPDT 2 340 may be configured to transmit a high band main signal to the high band main circuit path 314 of a second transceiver or a high band diversity signal to the high band diversity circuit path 318 of a second receiver.

In other embodiments, DPDT 1 330 may be configured to switch between transmitting a signal, such as a low band main signal, to the first diplexer 350 and transmitting a signal to the second diplexer 360. DPDT 2 340 may be configured to switch between transmitting a signal, such as a high band main signal, to the first diplexer 350 and transmitting a signal to the second diplexer 360.

The embodiment of FIG. 3 has been described with respect to comparing the performance of two antennas and determining which to assign to a main demodulation circuit path for high or low bands and which to assign to a diversity demodulation circuit path for high or low bands. Some mobile terminals, however, may include a quad-element LTE MIMO antenna array. In some applications only the optimal two antenna elements of the four are selected for operation with the other two antenna elements being disabled. As the antenna elements are typically spread out in the mobile terminal, the two antenna elements providing the best performance may vary depending on, for example, user effects or other external obstructions affecting signal reception.

Figure 4:
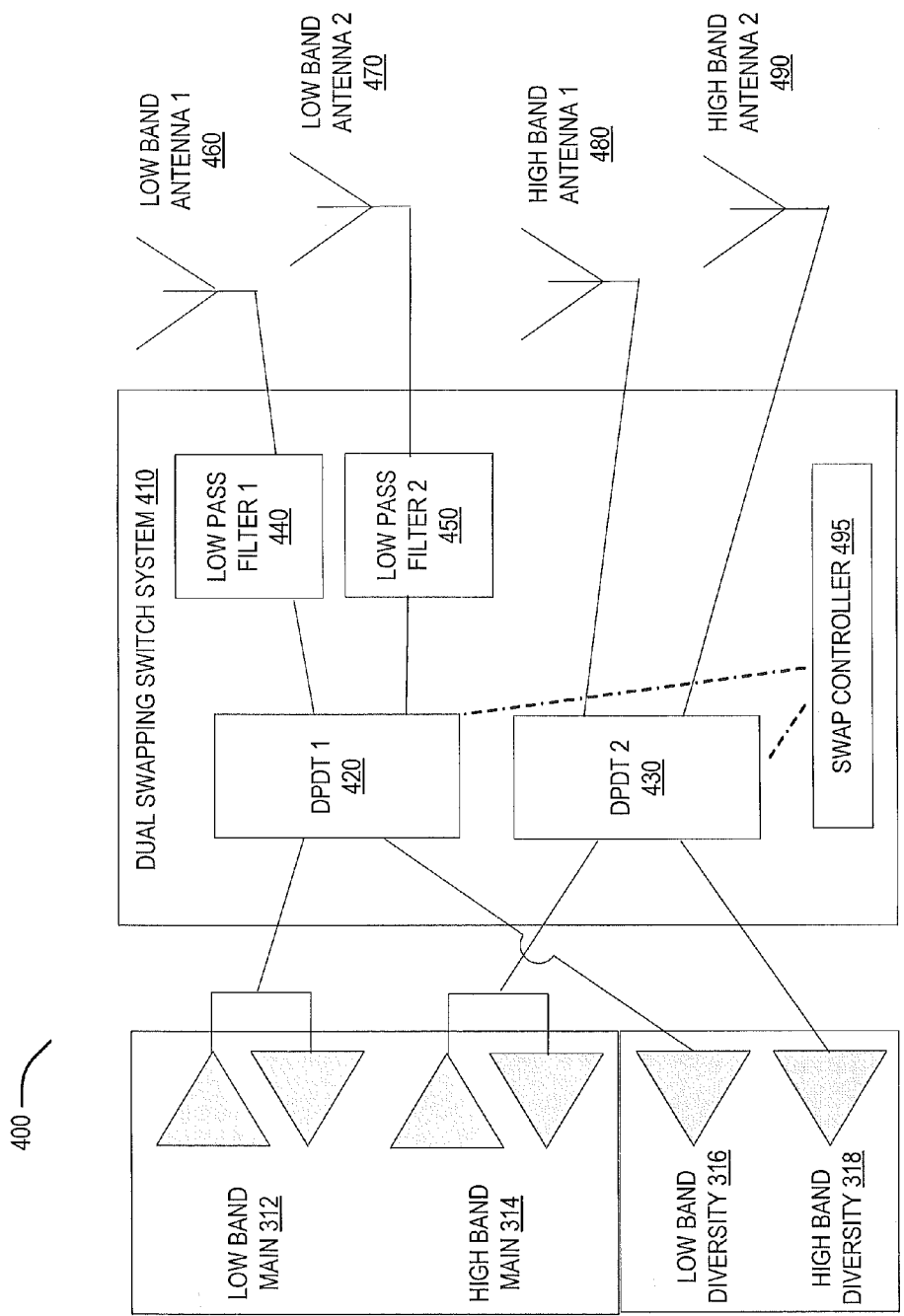
FIG. 4 is a block diagram illustrating another dual switch antenna swapping system in accordance with other embodiments.

FIG. 4 is a block diagram that illustrates a dual switch antenna swapping system for selecting an antenna in a mobile terminal that includes a MIMO antenna system 400 having four antenna elements, according to other embodiments. The MIMO antenna system 400 is similar to that illustrated in FIG. 3, but includes dual swapping switch system 410. Dual swapping switch system 410 has a different configuration then that of system 320.

System 410 includes two or more low pass filters, such as low pass filter 1 440 connected to low band antenna 1 460 and low pass filter 2 450 connected to low band antenna 2 470. Low pass filters 440 and 450 are configured to filter out high band signals so as to allow low band signals to continue down the chain. Dual antenna swapping switch system 410 includes DPDT 1 420 and DPDT 2 430. DPDT 1 420 is connected to low pass filter 1 440 and/or low pass filter 2 450. DPDT 2 430 is connected to high band antenna 1 480 and/or high band antenna 2 490. Each antenna may be internal to a mobile communication terminal, and which may be internal to the antenna switch structure, and are configured to transmit and receive wireless signals of different frequency bands relative to each other.

DPDT 1 420 is a DPDT switch that is controlled to switch between a first mode that connects low pass filter 1 440 to the circuit path of low band main 312 and low pass filter 2 450 to the circuit path of low band diversity 316 and a second mode that connects low pass filter 1 440 to the circuit path of low band diversity 316 and low pass filter 2 450 to the circuit path of low band main 312. DPDT 2 430 is a DPDT switch that is controlled to switch between a first mode that connects high band antenna 1 460 to the circuit path of high band main 314 and high band antenna 2 470 to the circuit path of high band diversity 318 and a second mode that connects high band antenna 1 460 to the circuit path of high band diversity 318 and high band antenna 2 470 to the circuit path of high band main 314. Modes and switching may be controlled by DPDT switches 420 and 430 or other components of dual swapping switch system 410, such as by swap controller 495. Swap controller 495 may operate similar to swap controller 390 described above.

In other implementations, as related to FIG. 4, DPDT 1 420 may receive a low band main signal or a low band diversity and may switch accordingly between both low band signals. Meanwhile, DPDT 2 430 may receive a high band main signal or a high band diversity signal and may switch accordingly between both high band signals. With dual DPDT switches, system 410 may swap high band signals and low band signals separately. In some cases, DPDT 1 420 may be active to switch low band signals while DPDT 2 430 may be inactive, and vice versa.

In further embodiments, DPDT 1 420 may be configured to switch between transmitting a low band main signal to the low band main circuit path 312 of the first transceiver and transmitting a low band diversity signal to the low band diversity circuit path 316 of the first receiver. DPDT 2 430 may be configured to switch between transmitting a high band main signal to the high band main circuit path 314 of the second transceiver and transmitting a high band diversity signal to the high band diversity circuit path 318 of the second receiver.

In other embodiments, DPDT 1 420 may be configured to switch between transmitting a signal to low pass filter 1 440 and transmitting a signal to low pass filter 2 450. DPDT 2 430 may be configured to switch between transmitting a signal to high band antenna 1 480 and transmitting a signal to high band antenna 2 490.

FIGS. 3 and 4 illustrate systems 320 and 410, respectively, as well as some additional components. It is to be understood that although only some elements have been illustrated for purposes of explanation of various embodiments of the present invention, further elements have been omitted for the sake of clarity. The embodiments of FIGS. 3 and 4 be coupled to processors and memories, including or in addition to swap controllers 390 and 495, containing computer readable code that when executed performs necessary algorithms to allow antenna reassignments between the main and diversity circuit paths to be conducted at any time without any loss in channel estimation and signal demodulation performance. Additionally, an antenna swapping algorithm may determine that one of the antennas (or combination of antennas) has a better/stronger signal quality measurement, and may thus command the DPDT switches, or other switches with similar functions and/or properties, (and maybe diplexers) to swap the antennas to use the better/stronger antenna (or combination/pair of antennas). Moreover, it will be understood that the antenna swapping algorithm may save/access the signal quality measurement or carrier aggregation information of the antenna configuration that was used by the wireless electronic device before the swapping.

Although only two DPDT switches 330 and 340, or switches 420 and 430, have been shown in FIGS. 3 and 4, it is to be understood that embodiments of the present invention are not limited thereto. Instead, more than two DPDT switches or multiplexers may be used, where each switch or multiplexer may be coupled to multiple antennas, filters or multiplexers.

Systems 320 and 410 provide flexibility so that a network can select low band or high band. According to various embodiments, system 320 or system 410 may perform carrier aggregation and filter out a harmonic frequency of a traveling signal associated with a circuit path of the first or second transceiver before the traveling signal is transmitted by the antennas.

Figure 5:
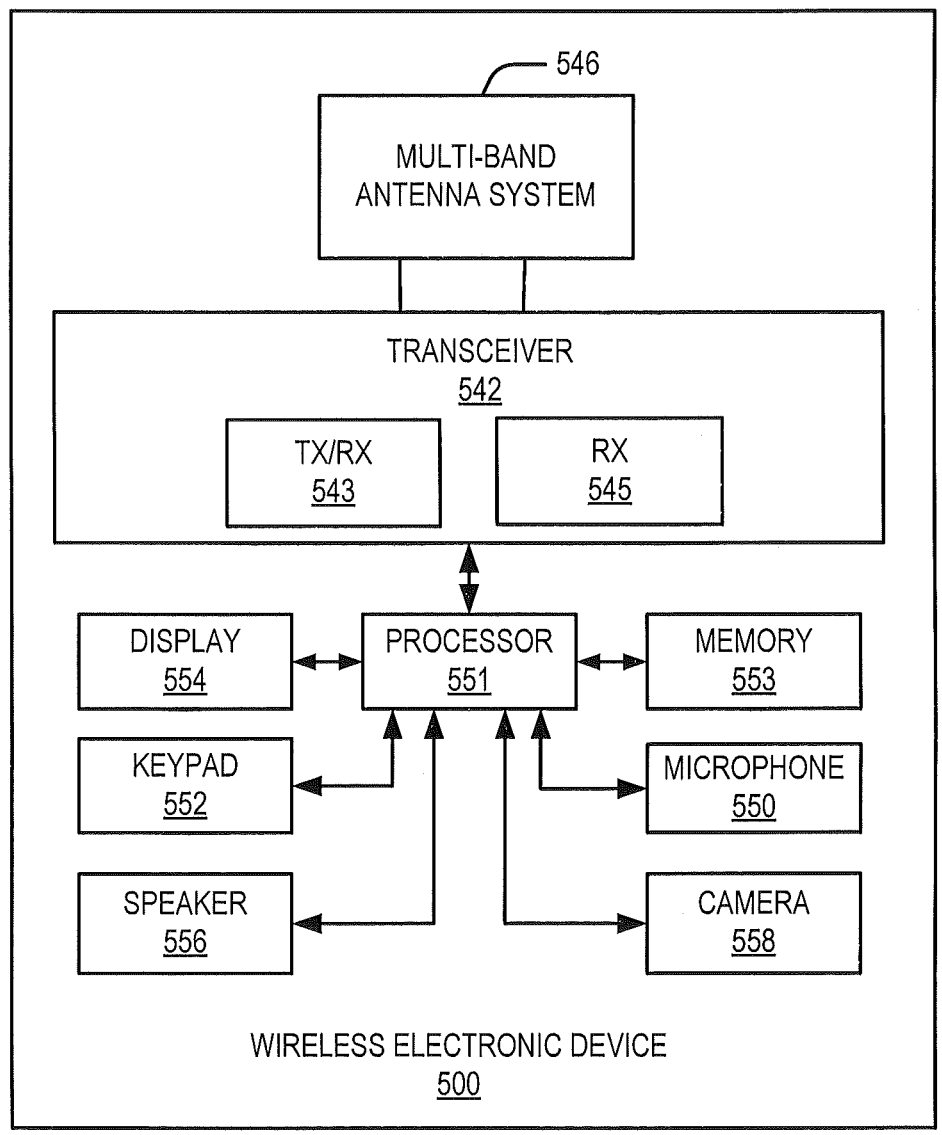
FIG. 5 is a block diagram of a mobile terminal in accordance with some embodiments of the present invention.

FIG. 5 is a block diagram of a wireless communication terminal 500 that includes a MIMO antenna array in accordance with some embodiments of the present invention. Referring to FIG. 5, the mobile terminal 500 includes a MIMO antenna system 546, a transceiver 542, a processor 551, and can further include a conventional display 554, keypad (perhaps on a touch screen) 552, speaker 556, mass memory 553, microphone 550, and/or camera 558, one or more of which may be electrically grounded to the same ground plane as the MIMO multi-band antenna system 546.

The antenna system 546 may be structurally configured as shown for the MIMO antenna arrays of FIGS. 3 and 4, or may be configured in accordance with various other embodiments of the present invention. Antenna system 546 and/or transceiver 542 may contain the elements of system 320 or system 410. In other cases, system 320 or system 410 may be connected between the multi-band antenna system 546 and transceiver 542, or the RF ASIC for transceiver 542 of the wireless electronic device 100 such that it can provide swapping between different antennas in the multi-band antenna system 546 for active use (e.g., for transmitting and/or receiving communications). Moreover, MIMO antennas in accordance with various embodiments of the present invention may be embodied as, but are not limited to, ground free monopole antennas, planar inverted F-antennas (PIFA) radiating elements and/or on-ground antenna radiating elements as well.

Transceiver 542 may include transmit/receive circuitry (TX/RX) that provides separate communication circuit paths for supplying/receiving RF signals to different radiating elements of the MIMO antenna system 546 via their respective RF feeds. Accordingly, when the MIMO antenna system 546 includes two or more radiating antenna elements, the transceiver 540 may include two or more transmit/receive circuits 543, 545 connected to different ones of the antenna elements via the respective RF feeds. In some cases, 545 represents one or more receivers. In other cases, 545 represents one or more transceivers.

Transceiver 542, in cooperation with the processor 551, may be configured to communicate according using at least one radio access technology in two or more frequency ranges. The at least one radio access technology may include, but is not limited to, WLAN (e.g., 802.11), WiMAX (Worldwide Interoperability for Microwave Access), TransferJet, 3GPP LTE (3rd Generation Partnership Project Long Term Evolution), Universal Mobile Telecommunications System (UMTS), Global Standard for Mobile (GSM) communication, General Packet Radio Service (GPRS), enhanced data rates for GSM evolution (EDGE), DCS, PDC, PCS, code division multiple access (CDMA), wideband-CDMA, and/or CDMA2000. The radio access technology may operate using such frequency bands as 700-800 Megahertz (MHz), 824-894 MHz, 880-960 MHz, 1710-1880 MHz, 1820-1990 MHz, 1920-2170 MHz, 2300-2400 MHz, and 2500-2700 MHz. Other radio access technologies and/or frequency bands can also be used in embodiments according to the invention. Various embodiments may provide coverage for non-cellular frequency bands such as Global Positioning System (GPS), Wireless Local Area Network (WLAN), and/or Bluetooth frequency bands. As an example, in various embodiments according to the inventive concepts, the local wireless network is a WLAN compliant network. In various other embodiments according to the inventive concepts, a local wireless network is a Bluetooth compliant interface.

A transmitter portion of a transceiver 542 converts information, which is to be transmitted by the wireless electronic device 100, into electromagnetic signals suitable for radio communications. A receiver portion of the transceiver 542 demodulates electromagnetic signals, which are received by the wireless electronic device 500 from the network to provide the information contained in the signals in a format understandable to a user of the wireless electronic device 500.

The wireless electronic device 500 is not limited to any particular combination/arrangement of the keypad 552 and the display 554. As an example, it will be understood that the functions of the keypad 552 and the display 554 can be provided by a touch screen through which the user can view information, such as computer displayable documents, provide input thereto, and otherwise control the wireless electronic device 500. Additionally or alternatively, the wireless electronic device 500 may include a separate keypad 552 and display 554.

The memory 553 can store computer program instructions that, when executed by the processor circuit 551, carry out the operations described herein and shown in the figures. As an example, the memory 553 can be non-volatile memory, such as EEPROM (flash memory), that retains the stored data while power is removed from the memory 553.

It will be appreciated that certain characteristics of the components of the MIMO antennas shown in the figures such as, for example, the relative widths, conductive lengths, and/or shapes of the radiating elements, the conductive neutralization lines, and/or other elements of the MIMO antennas may vary within the scope of the present invention.

Many variations and modifications can be made to the exemplary embodiments without substantially departing from the principles of the present invention. All such variations and modifications are intended to be included herein Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. An antenna switch structure for use in a mobile communication terminal, the antenna switch structure comprising:
   a first transceiver comprising a low band main circuit path configured to process signals of a low main frequency band;
   a first receiver comprising a low band diversity circuit path configured to process signals of a low diversity frequency band;
   a second transceiver comprising a high band main circuit path configured to process signals of a high main frequency band;
   a second receiver comprising a high band diversity circuit path configured to process signals of a high diversity frequency band;
   a first dual band antenna configured to transmit and receive wireless signals of two or more frequency bands;
   a second dual band antenna configured to transmit and receive wireless signals of two or more frequency bands;
   a first diplexer connected to the first dual band antenna comprising a first port and a second port;
   a second diplexer connected to the second dual band antenna comprising a first port and a second port;
   a first switch controlled to switch between a first mode that connects the first port of the of the first diplexer to the first transceiver and the first port of the second diplexer to the first receiver and a second mode that connects the first port of the first diplexer to the first receiver and the first port of the second diplexer to the first transceiver, wherein a mode of the first switch is selected in response to signals received at the first switch; and
   a second switch controlled to switch between a first mode that connects the second port of the first diplexer to the second transceiver and the second port of the second diplexer to the second receiver and a second mode that connects the second port of the first diplexer to the second receiver and the second port of the second diplexer to the second transceiver, wherein a mode of the second switch is selected in response to signals received at the second switch.

2. The antenna switch structure of claim 1, wherein the mode of the first switch is further selected in response to a signal received at the second switch and the mode of the second switch is further selected in response to a signal received at the first switch.

3. The antenna switch structure of claim 1, wherein the first mode of the first switch transmits a low band main signal to the low band main circuit path of the first transceiver and the second mode of the first switch transmits a low band diversity signal to the low band diversity circuit path of the first receiver.

4. The antenna switch structure of claim 1, wherein the first mode of the second switch transmits a high band main signal to the high band main circuit path of the second transceiver and the second mode of the second switch transmits a high band diversity signal to the high band diversity circuit path of the second receiver.

5. The antenna switch structure of claim 1, wherein the first switch is configured to switch between transmitting a signal to the first diplexer and transmitting a signal to the second diplexer.

6. The antenna switch structure of claim 5, wherein the first switch is configured to switch between transmitting a low band main signal to the first diplexer and transmitting a low band main signal to the second diplexer.

7. The antenna switch structure of claim 1, wherein the second switch is configured to switch between transmitting a signal to the first diplexer and transmitting a signal to the second diplexer.

8. The antenna switch structure of claim 7, wherein the second switch is configured to switch between transmitting a high band main signal to the first diplexer and transmitting a high band main signal to the second diplexer.

9. The antenna switch structure of claim 1, wherein the antenna switch structure is configured to perform carrier aggregation.

10. The antenna switch structure of claim 9, wherein a harmonic frequency of a traveling signal associated with a circuit path of the first or second transceiver is filtered out before the traveling signal is transmitted by the first or second dual band antenna.

11. An antenna switch structure for use in a mobile communication terminal, the antenna switch structure comprising:
    a first transceiver comprising a low band main circuit path configured to process signals of a low main frequency band;
    a first receiver comprising a low band diversity circuit path configured to process signals of a low diversity frequency band;
    a second transceiver comprising a high band main circuit path configured to process signals of a high main frequency band;
    a second receiver comprising a high band diversity circuit path configured to process signals of a high diversity frequency band;
    a first low band antenna configured to transmit and receive wireless signals of a low frequency band;
    a second low band antenna configured to transmit and receive wireless signals of a low frequency band;
    a first high band antenna configured to transmit and receive wireless signals of a high frequency band;
    a second high band antenna configured to transmit and receive wireless signals of a high frequency band;
    a first low pass filter connected to the first low band antenna;
    a second low pass filter connected to the second low band antenna;
    a first switch controlled to switch between a first mode that connects the first low pass filter to the first transceiver and the second low pass filter to the first receiver and a second mode that connects the first low pass filter to the first receiver and the second low pass filter to the first transceiver, wherein a mode of the first switch is selected in response to signals received at the first switch; and
    a second switch controlled to switch between a first mode that connects the first high band antenna to the second transceiver and the second high band antenna to the second receiver and a second mode that connects the first high band antenna to the second receiver and the second high band antenna to the second transceiver, wherein a mode of the second switch is selected in response to signals received at the second switch.

12. The antenna switch structure of claim 11, wherein the mode of the first switch is further selected in response to a frequency of a signal received at the second switch and the mode of the second switch is further selected in response to a frequency of a signal received at the first switch.

13. The antenna switch structure of claim 11, wherein the first mode of the first switch transmits a low band main signal to the low band main circuit path of the first transceiver and the second mode of the first switch transmits a low band diversity signal to the low band diversity circuit path of the first receiver.

14. The antenna switch structure of claim 11, wherein the first mode of the second switch transmits a high band main signal to the high band main circuit path of the second transceiver and the second mode of the second switch transmits a high band diversity signal to the high band diversity circuit path of the second receiver.

15. The antenna switch structure of claim 11, wherein the first switch is configured to switch between transmitting a signal to the first low pass filter and transmitting a signal to the second low pass filter.

16. The antenna switch structure of claim 15, wherein the second switch is configured to switch between transmitting a signal to the first high band antenna and transmitting a signal to the second high band antenna.

17. The antenna switch structure of claim 11, wherein the antenna switch structure is configured to perform carrier aggregation.

18. The antenna switch structure of claim 17, wherein a harmonic frequency of a traveling signal associated with a circuit path of the first or second transceiver is filtered out before the traveling signal is transmitted by an antenna.

19. A wireless electronic device, comprising:
first and second dual band antennas;
first and second diplexers, each diplexer connected to the first and second dual band antennas;
a radio configured for carrier aggregation, comprising:
a first frequency circuit path;
a second frequency circuit path;
a third frequency circuit path; and
a fourth frequency circuit path;
a first switch controlled to switch between a first mode that connects the first diplexer to the first frequency circuit path and the second diplexer to the second frequency circuit path and a second mode that connects the first diplexer to the second frequency circuit path and the second diplexer to the first frequency circuit path, wherein a mode of the first switch is selected in response to signals received at the first switch; and
a second switch controlled to switch between a first mode that connects the first diplexer to the third frequency circuit path and the second diplexer to the fourth frequency circuit path and a second mode that connects the first diplexer to the fourth frequency circuit path and the second diplexer to the third frequency circuit path, wherein a mode of the second switch is selected in response to signals received at the second switch.

20. The wireless electronic device of claim 19, wherein a harmonic frequency of a traveling signal associated with a circuit path of the radio is filtered out.

* * * * *